US012070843B2

(12) United States Patent
Brelot et al.

(10) Patent No.: US 12,070,843 B2
(45) Date of Patent: Aug. 27, 2024

(54) COMBUSTION CHAMBER RING FOR FASTENER DRIVING TOOL

(71) Applicant: Illinois Tool Works Inc., Glenview, IL (US)

(72) Inventors: Florian Brelot, Chanas (FR); Ninad C. Maniar, Gurnee, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 18/056,050

(22) Filed: Nov. 16, 2022

(65) Prior Publication Data

US 2023/0158652 A1 May 25, 2023

Related U.S. Application Data

(60) Provisional application No. 63/282,525, filed on Nov. 23, 2021.

(51) Int. Cl.
*B25C 1/08* (2006.01)
*B25C 1/00* (2006.01)

(52) U.S. Cl.
CPC ................ *B25C 1/08* (2013.01); *B25C 1/008* (2013.01)

(58) Field of Classification Search
CPC ........... B25C 1/08; B25C 1/008; B25C 1/082; B25C 1/10; B25C 1/18; B25C 1/188
See application file for complete search history.

(56) References Cited

U.S. PATENT DOCUMENTS 4,403,722 A 9/1983 Nikolich
5,197,646 A 3/1993 Nikolich
6,173,963 B1 1/2001 Ho et al.
6,755,159 B1 6/2004 Adams et al.
8,302,831 B2 11/2012 Taylor et al.
9,492,915 B2 11/2016 Largo et al.
11,141,845 B2 10/2021 Taylor et al.
2003/0034377 A1 2/2003 Porth et al.
2003/0037746 A1 2/2003 Porth
2006/0129009 A1 6/2006 Nishikawa et al.
2012/0267417 A1* 10/2012 Vanstaan .................. B25C 1/08 227/9
2017/0036335 A1 2/2017 Largo et al.
2018/0215023 A1 8/2018 Taylor et al.
2021/0053198 A1 2/2021 Popovich et al.

FOREIGN PATENT DOCUMENTS

DE 202005011723 U1 10/2005
GB 2418636 A 4/2006

OTHER PUBLICATIONS

International Search Report and Written Opinion from International Application No. PCT/US2022/080044, dated Mar. 28, 2023 (13 pages).
Yagid, Rob, "Cordless Finish Nailer", Fine Homebuilding, 2011 (2 pages).

* cited by examiner

*Primary Examiner* — Anna K Kinsaul
*Assistant Examiner* — Veronica Martin
(74) *Attorney, Agent, or Firm* — Neal, Gerber & Eisenberg LLP

(57) ABSTRACT

A combustion powered fastener driving tool including a combustion chamber ring configured to connect the combustion chamber to the cylinder head, the combustion chamber ring configured to reduce turbulence and velocity of vaporized fuel dispensed into the combustion chamber from the fuel cell.

14 Claims, 11 Drawing Sheets

COMBUSTION CHAMBER RING FOR FASTENER DRIVING TOOL

PRIORITY

This application claims priority to and the benefit of U.S. Provisional Patent Application No. 63/282,525, filed Nov. 23, 2021, the contents of which are incorporated herein by reference in their entirety.

FIELD

The present disclosure relates to fastener driving tools, and specifically to combustion powered fastener driving tools with improved combustion chamber rings.

BACKGROUND

Powered fastener driving tools use one of several types of power sources to carry out a fastener driving cycle to drive a fastener (such as a nail or a staple) into a workpiece. More specifically, a powered fastener driving tool uses a power source to force a driving assembly, such as a piston carrying a driver blade, through a cylinder from a pre-firing position to a firing position. As the driving assembly moves to the firing position, the driver blade travels through a nosepiece, which guides the driver blade to contact a fastener housed in the nosepiece. Continued movement of the driving assembly through the cylinder toward the firing position forces the driver blade to drive the fastener from the nosepiece into the workpiece. The driving assembly is then forced back to the pre-firing position in a way that depends on the tool's construction and power source. A fastener advancing device forces another fastener from a magazine into the nosepiece, and the tool is ready to fire again.

Combustion powered fastener driving tools are one type of powered fastener driving tools that typically use a small internal combustion assembly as their power source. To operate various known combustion powered fastener driving tools, an operator depresses a workpiece contact element of the tool onto a workpiece. This moves the workpiece contact element from an extended position to a retracted position, which causes one or more mechanical linkages to cause: (1) a valve sleeve to move to a sealed position to seal a combustion chamber; and (2) a fuel supply assembly to dispense fuel from a fuel cell into the (now sealed) combustion chamber. The fuel supply assembly is configured to dispense only a desired amount of fuel to the combustion chamber for each combustion event. The amount of fuel is carefully determined to provide the desired combustion in a fuel efficient manner to prolong the working life of the fuel cell.

The operator then pulls the trigger to actuate a trigger switch, thereby causing a spark generator to deliver a spark and ignite the fuel/air mixture in the combustion chamber to start the fastener driving cycle. This generates high-pressure combustion gases that expand and act on the piston to force the driving assembly to move through the cylinder from the pre-firing position to the firing position, thereby causing the driver blade to contact a fastener housed in the nosepiece and drive the fastener from the nosepiece into the workpiece.

Certain known driving assemblies of combustion powered fastener driving tools include combustion chamber rings that can, in some circumstances, cause inconsistent or incomplete combustion of fuel in the combustion chamber. For example, when certain known combustion powered fastener driving tools are actuated in relatively cold weather, certain known combustion chamber rings can cause the turbulence in the combustion chamber to be directed toward the ignition tip of the spark plug that extends into the combustion chamber. This turbulence directly toward the ignition tip can inhibit or deter sparks from occurring and thus cause inconsistent or incomplete combustion of the fuel. There is a need for a combustion powered fastener driving tool that overcomes such issues such that the driving assembly can consistently and completely combust the fuel during each combustion cycle of the tool.

SUMMARY

Various embodiments of the present disclosure provide a combustion powered fastener driving tool that solves the above problems in part by changing the direction of the turbulence in the combustion chamber and eliminating or reducing the likelihood of causing inconsistent or incomplete combustion of the fuel.

In various example embodiments of the present disclosure, the fastener driving tool includes a housing, a fastener driving assembly at least partially positioned in, connected to, and supported by the housing, a handle assembly connected to the housing, a fastener magazine assembly connected to the housing and the handle assembly, a workpiece contact assembly connected to the housing, and a fuel supply assembly at least partially positioned in, supported by, and connected to the housing. The fastener driving assembly includes a combustion chamber ring that is configured, shaped, and sized to reduce turbulence and velocity of vaporized fuel in the combustion chamber at and around the injection tip of the spark plug just prior to and during combustion of the fastener driving tool.

Other objects, features, and advantages of the present disclosure will be apparent from the following detailed disclosure and accompanying drawings.

DETAILED DESCRIPTION

Figure 1:
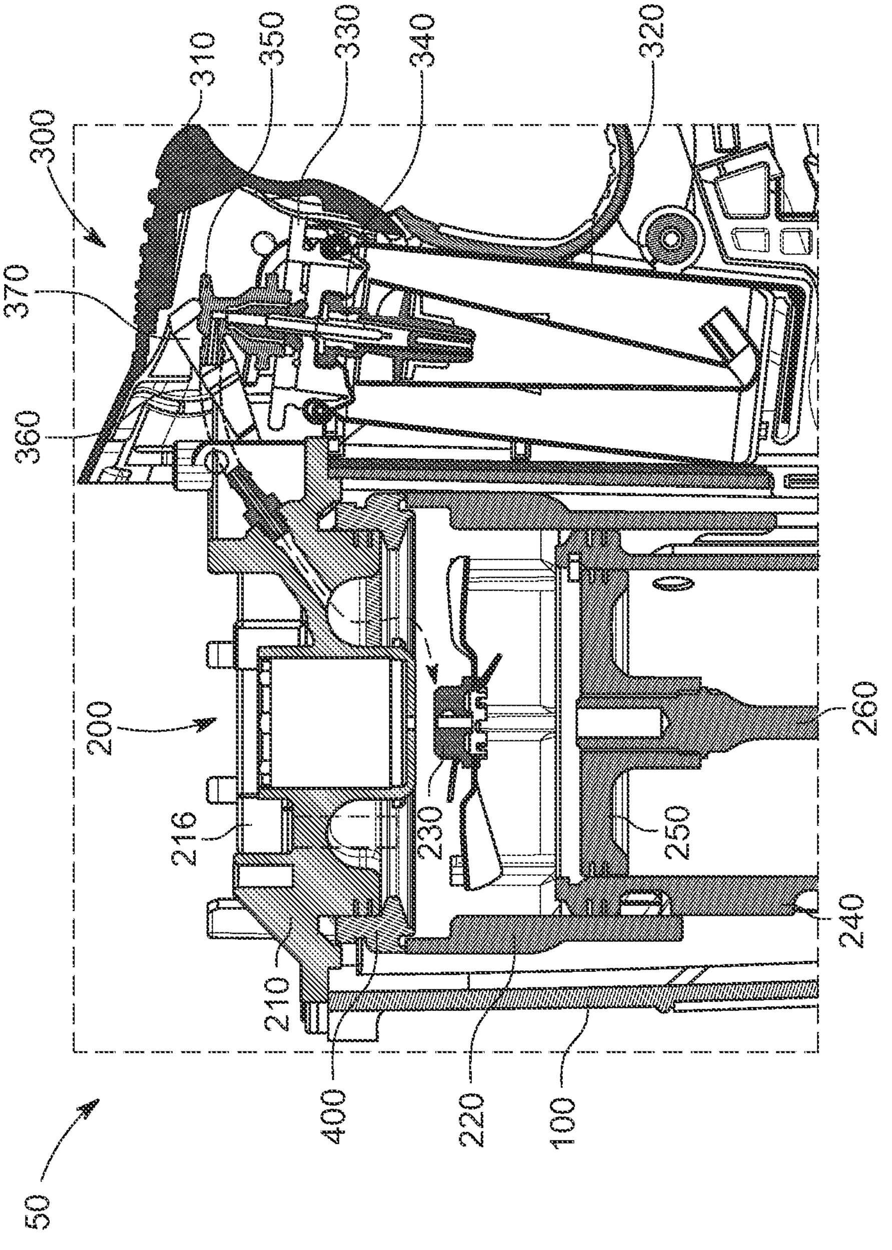
FIG. 1 (Prior Art)
FIG. 1 is an enlarged fragmentary cross-sectional view of part of a known fastener driving tool showing the fuel supply assembly mounted in the housing and showing part of the fastener driving assembly.

While the systems, devices, and methods described herein may be embodied in various forms, the drawings show, and the specification describes certain exemplary and non-limiting embodiments. Not all of the components shown in the drawings and described in the specification may be required, and certain implementations may include additional, different, or fewer components. Variations in the arrangement and type of the components; the shapes, sizes, and materials of the components; and the manners of connections of the components may be made without departing from the spirit or scope of the claims. Unless otherwise indicated, any directions referred to in the specification reflect the orientations of the components shown in the corresponding drawings and do not limit the scope of the present disclosure. Further, terms that refer to mounting methods, such as mounted, connected, etc., are not intended to be limited to direct mounting methods but should be interpreted broadly to include indirect and operably mounted, connected, and like mounting methods. This specification is intended to be taken as a whole and interpreted in accordance with the principles of the present disclosure and as understood by one of ordinary skill in the art.

For a better understanding of the present disclosure, an example known combustion powered fastener driving tool is first partially described.

Figure 2:
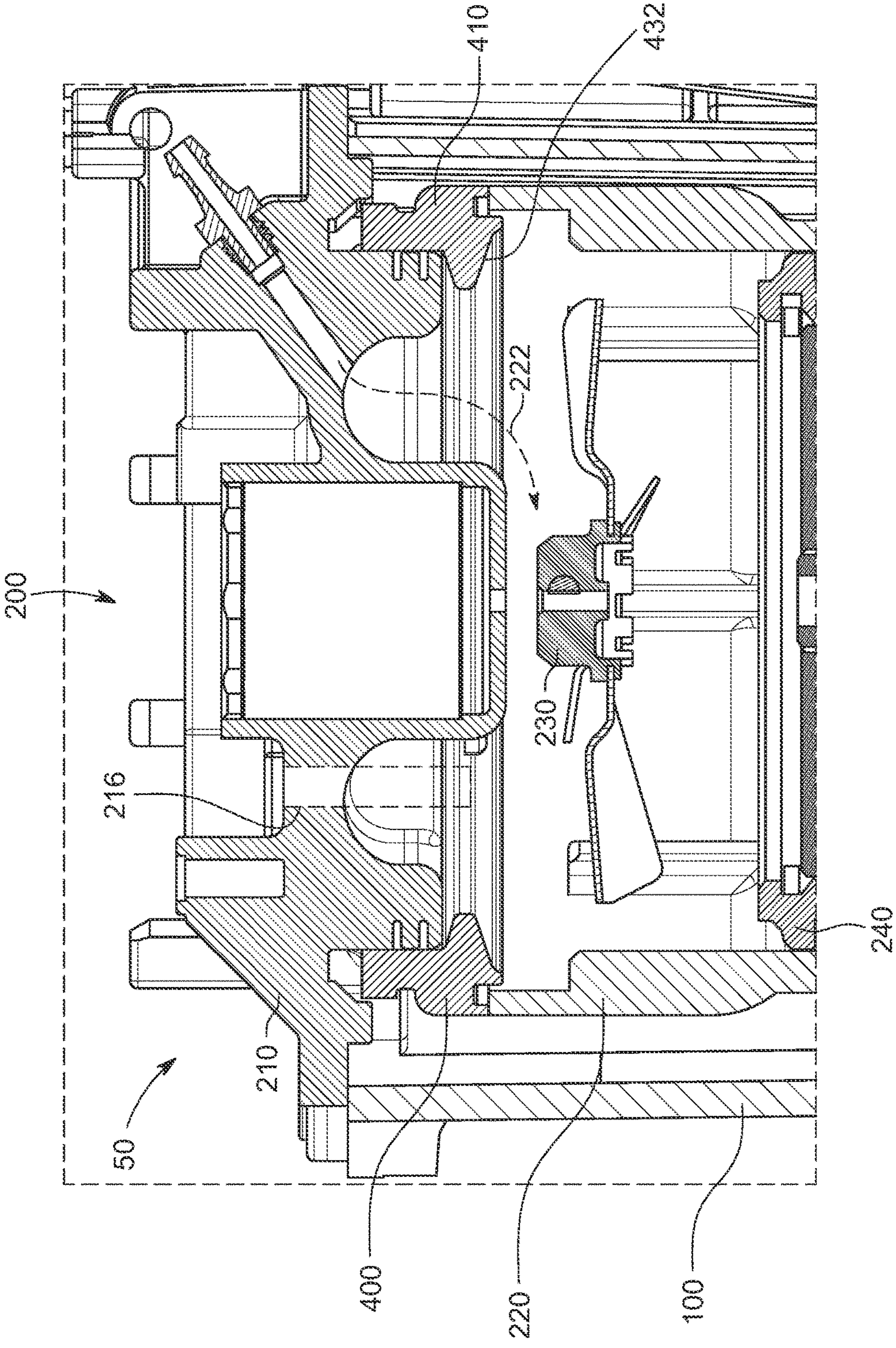
FIG. 2 (Prior Art)
FIG. 2 is an enlarged fragmentary side cross-sectional view of a part of the known fastener driving assembly of the fastener driving tool of FIG. 1, showing the cylinder head, the combustion chamber ring, and part of the combustion chamber.
Figure 3:
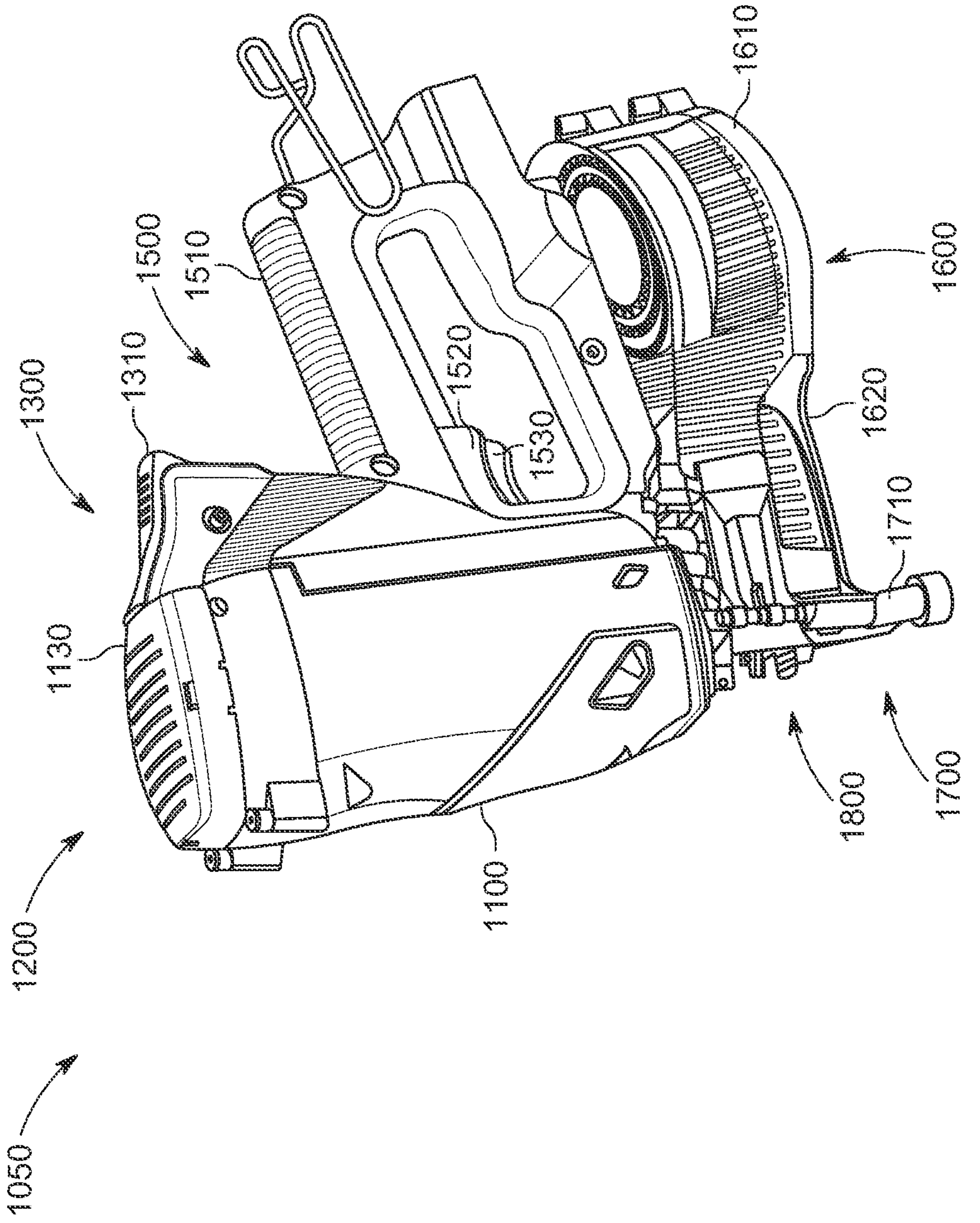
FIG. 3 is a perspective view of an example embodiment of a fastener driving tool of the present disclosure.
Figure 4:
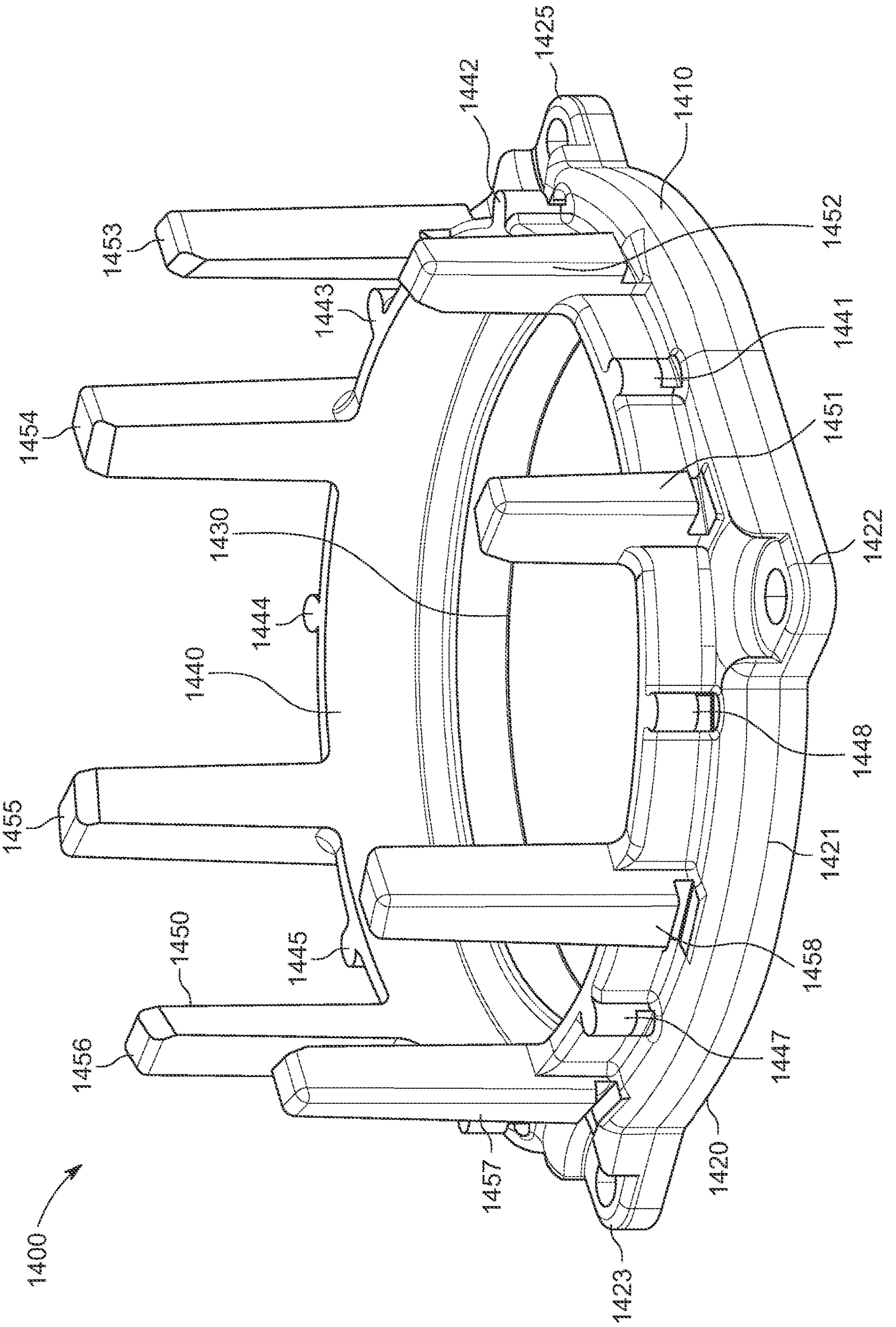
FIG. 4 is an enlarged perspective view of the combustion chamber ring of the fastener driving tool of FIG. 3.
Figure 5:
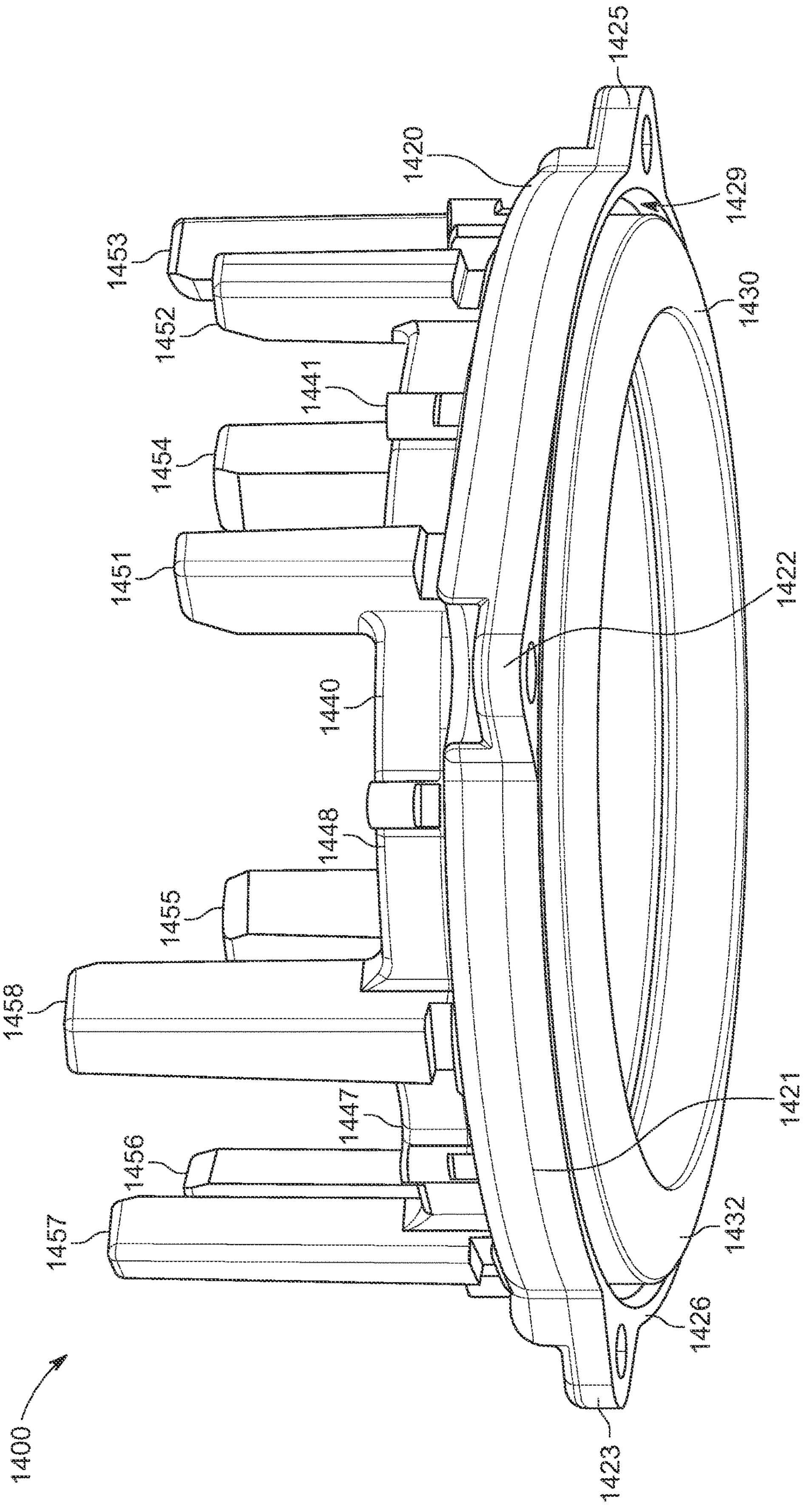
FIG. 5 is an enlarged bottom perspective view of the combustion chamber ring of FIG. 4.
Figure 6:
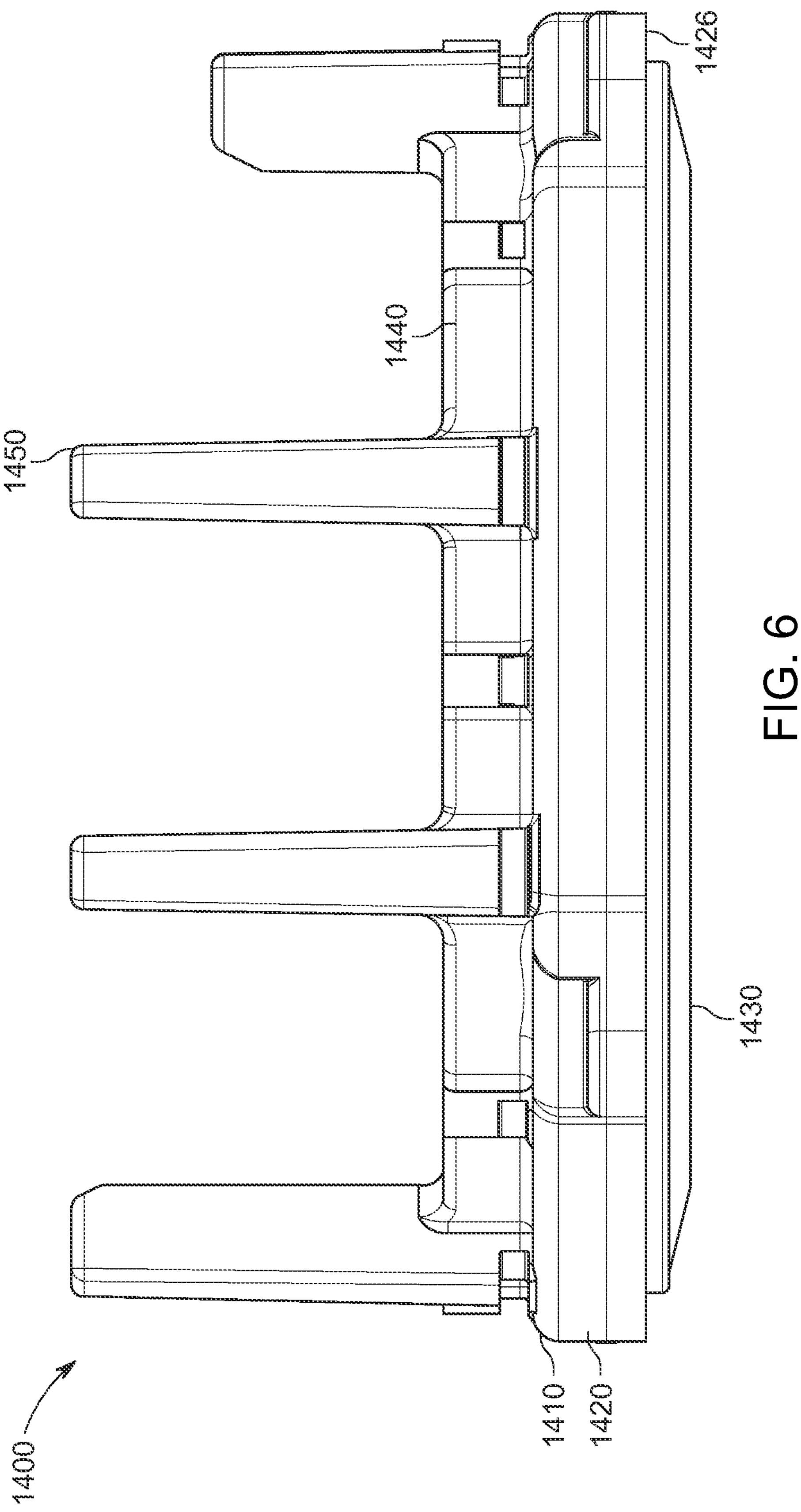
FIG. 6 is an enlarged side perspective view of the combustion chamber ring of FIG. 4.
Figure 7:
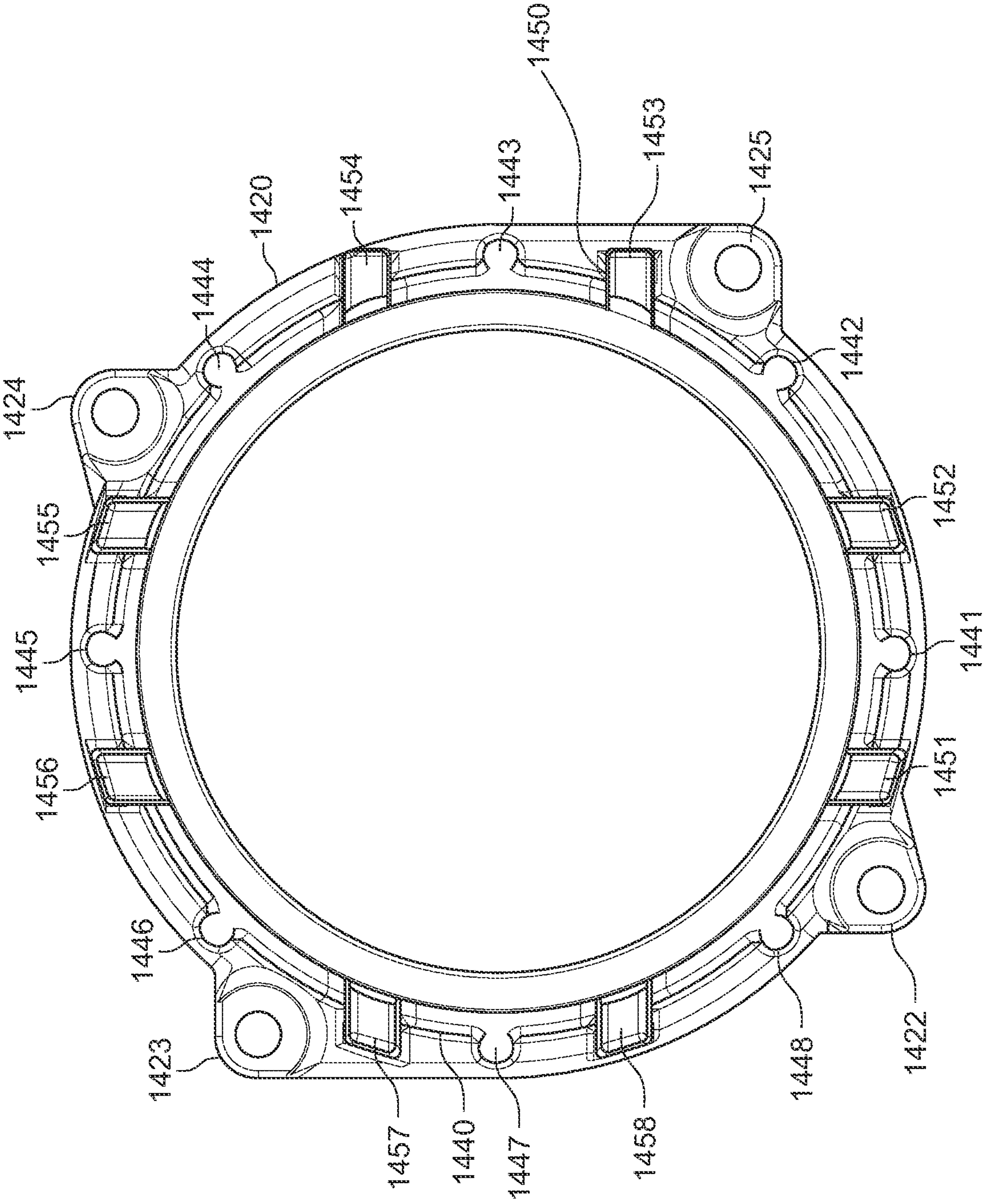
FIG. 7 is an enlarged top perspective view of the combustion chamber ring of the FIG. 4.
Figure 8:
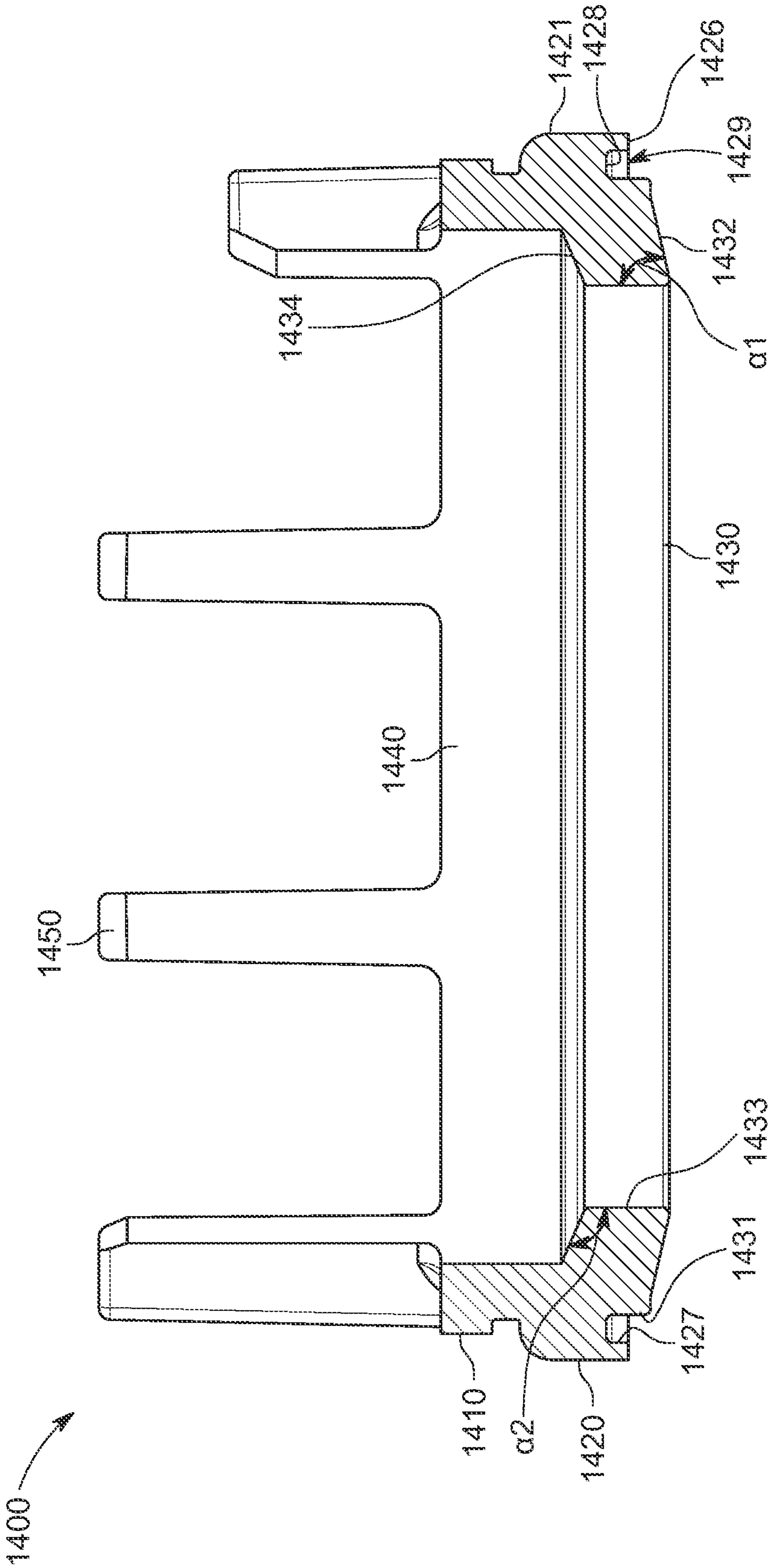
FIG. 8 is an enlarged cross-sectional view of the combustion chamber ring of FIG. 4.

FIGS. 1 and 2 illustrate an example known combustion powered fastener driving tool 50 (that is sometimes referred to herein as "known tool" for brevity). FIGS. 1 and 2 show selected components of the example known tool 50 including: (1) a housing 100; (2) a fastener driving assembly 200 partially positioned in, supported by, and connected to the housing 100; and (3) a fuel supply assembly 300 partially positioned in, supported by, and connected to the housing 100.

In the illustrated known fastener driving tool 50, the fastener driving assembly 200 includes: (1) a cylinder head 210; (2) a combustion chamber 220 suitably connected to the cylinder head 210; (3) a circulating fan 230 suitably mounted to the cylinder head 210 and projecting into the combustion chamber 220; (4) a sleeve 240 suitably connected to the combustion chamber 220; (5) a driving blade 250; (6) a piston 260 positioned in the sleeve 240 and suitably connected to the driving blade 250; and (7) a combustion chamber ring 400 suitably connected to an upper portion of the combustion chamber 220 and the cylinder head 210.

In the illustrated known fastener driving tool 50, the fuel supply assembly 300 includes: (1) a fuel cell door 310 pivotally connected to the housing 100; (2) a fuel cell 320 receivable in and at least partially supported by the housing 100; (3) a fuel cell adapter 330 suitably connected to the fuel cell 320; (4) a fuel cell metering valve 340 connected to the fuel cell adapter 330 and extending into a portion of the fuel cell 320; (5) a fuel cell receiving block 350 mounted on, connected to, and in fluid communication with the fuel cell adapter 330; (6) a fuel line 360 suitably connected between the fuel cell receiving block 350 and the cylinder head 210 to define a fuel pathway between the fuel cell 320 and the combustion chamber 220; and (7) a dosing lever 370 pivotally supported by the cylinder head 210 and engaged to the fuel cell receiving block 350. The fuel cell 320 and the adapter 330 are described as part of the fuel supply assembly for ease of description but are separate components receivable by the tool 50.

In the illustrated known fastener driving tool 50, the combustion chamber ring 400 is positioned between the cylinder head 210 and the combustion chamber 220. The combustion chamber ring 400 is supported by and suitably connects the combustion chamber 220 to the cylinder head 210. The combustion chamber ring 400 includes: (1) a body 410 that has an upwardly angled bottom surface 432 that is positioned, at least in part, in the combustion chamber 220. During operation, vaporized fuel (shown in phantom as arrow 222) is injected into the combustion chamber 220, via the fuel supply assembly 300. A spark plug 216 is supported by and connected to the cylinder head 210 such that the spark plug 216 can ignite the vaporized fuel 222 in the combustion chamber 220 to cause a driving blade 250 to move downwardly through the cylinder 240.

However, the upwardly angled bottom surface 432 of the combustion chamber ring 400 of this illustrated known fastener driving tool 50 can interact with the vaporized fuel 222 as it is injected into the combustion chamber 220. This interaction between the vaporized fuel 222 and upwardly angled bottom surface 432 of the combustion chamber ring 400 causes turbulence of the vaporized fuel 222 in the combustion chamber 220 directed at the ignition tip of the spark plug 216. In certain cases, this directed turbulence, combined with environmental conditions such as relatively low temperatures can cause the spark plug to fail to consistently create sparks and thus can cause the fastener driving tool 50 to not operate optimally. The apparatus of the present disclosure overcomes these problems.

FIGS. 3, 4, 5, 6, 7, 8, 9, 10, and 11 illustrate the combustion powered fastener driving tool of one example embodiment of the present disclosure that is generally indicated by numeral 1050 (that is sometimes referred to herein as the "tool" for brevity). The illustrated example shows selected components of the tool 1050 during operation of the tool 1050 to drive a fastener (not shown) into a workpiece. Other components of the tool 1050 not discussed herein will be readily understood by those skilled in the art.

The illustrated example tool 1050 includes: (1) a housing 1100; (2) a fastener driving assembly 1200 at least partially positioned in, supported by and connected to the housing 1100; (3) a fuel supply assembly 1300 partially positioned in, supported by, and connected to the housing 1100; (4) a handle assembly 1500 supported by and connected to the housing 1100; (5) a fastener magazine assembly 1600 supported by and connected to the housing 1100 and the handle assembly 1500; (6) a workpiece contact assembly 1700 supported by and connected to the housing 1100; and (7) a nosepiece assembly 1800 supported by and connected to a lower portion of the housing 1100. The illustrated example combustion powered fastener driving tool 1050 in this example is known in the industry as is a mid-range combustion powered fastener driving tool; however, it should be understood that the present disclosure can also be applied to what is known in the industry as framing combustion powered fastener driving tools, what is known in the industry as trim combustion powered fastener driving tools, and other combustion powered tools.

The housing 1100 includes: (1) a first wall 1110; (2) a second wall 1120 opposite of the first wall; and (3) a housing cap 1130 suitably connected to the first and second walls

1110 and 1120 of the housing 1100. The housing 1100 thus provides a suitable protective enclosure for the fastener driving assembly 1200, the fuel supply assembly 1300, and other components of the tool 1050.

The fastener driving assembly 1200 includes, in part: (1) a cylinder head 1210 connected to the housing cap 1130; (2) a combustion chamber 1220 suitably connected to the cylinder head 1210; (3) a circulating fan 1230 suitably mounted to the cylinder head 1210 and projecting into the combustion chamber 1220; (4) a sleeve 1240 suitably connected to the combustion chamber 1220; (5) a driving blade 1250; (6) a piston 1260 positioned in the sleeve 1240 and suitably connected to the driving blade 1250; and (7) a combustion chamber ring 1400 disposed between the combustion chamber 1220 and the cylinder head 1210. The combustion chamber ring 1400 suitably seals the cylinder head 1210 to an upper portion of the combustion chamber 1220. The combustion chamber ring 1400 (that is sometimes herein referred to as "chamber ring" for brevity) is further described below.

The fuel supply assembly 1300 includes, in part: (1) a fuel cell door 1310 pivotally connected to the housing cap 1130 of the housing 1100; (2) a fuel cell receiving assembly 1316 positioned in and at least partially supported by the housing 1100 and configured to receive a removable fuel cell 1320; (3) a fuel cell adapter 1330 suitably connected to the fuel cell 1320; (4) a fuel cell metering valve 1340 connected to the fuel cell adapter 1330 and extending into a portion of the fuel cell 1320; (5) a fuel cell receiving block 1350 connected to and in fluid communication with the fuel cell adapter 1330; (6) a fuel line 1360 suitably connected between the fuel cell receiving block 1350 and the cylinder head 1210 to define a fuel passageway between the fuel cell 1320 and the combustion chamber 1220; and (7) a dosing lever 1370 pivotally supported in the housing 1100 and engaged to the fuel cell receiving block 1350. It should be appreciated that while the fuel cell 1320 and the fuel cell adapter 1330 of the present disclosure are described herein as part of the fuel supply assembly 1300 of the tool 1050 for ease of description, that these components will typically be provided separately from the tool 1050 and insertable in the tool 1050, and thus to a certain extent are not part of the fuel supply assembly 1300, but rather connectable to and operable with the fuel supply assembly 1300 of the tool 1050.

The handle assembly 1500 includes, in part: (1) a gripping portion 1510; (2) a trigger mount 1520 defined on the gripping portion 1510; and (3) a trigger 1530 suitably connected to the trigger mount 1520 via a trigger pin (not shown) such that a portion of the trigger 1530 can move relative to the gripping portion 1510. The handle assembly 1500 is suitably connected to the housing 1100.

The fastener magazine assembly 1600 includes, in part: (1) a fastener cannister 1610 configured to hold a plurality of fasteners (e.g., nails, or staples); and (2) a fastener channel 1620 suitably connected to the nosepiece assembly 1800 and to the handle assembly 1500. During operation of the tool 1050, a fastener is delivered, via the fastener channel 1620, to the nosepiece assembly 1800 and driven into the workpiece by the fastener driving assembly 1200.

The workpiece contact assembly 1700 includes, in part, a workpiece contact element 1710 suitably connected to the nosepiece assembly 1800 and to the fastener magazine assembly 1600. The workpiece contact element 1710 contacts the location where the fastener is driven into the workpiece by the tool 1050. The nosepiece assembly 1800 is suitably connected to the fastener magazine assembly 1600 and to the cylinder 1240. The nosepiece assembly 1800 receives a fastener from the fastener channel 1620. During operation of the tool 1050, the piston 1260 is driven downward via the driving blade 1250 in the cylinder 1240, contacts the fastener positioned in the nosepiece assembly 1800 and drives the fastener into the workpiece.

The example chamber ring 1400 of the present disclosure is now further described. FIGS. 4 to 10 illustrate the example chamber ring 1400 of the example fastener driving tool 1050. The illustrated chamber ring 1400 includes an annular body 1410 that defines a ring like structure configured to suitably seal the combustion chamber 1220 and cylinder head 1210 of the fastener driving assembly 1200. More specifically, the body 1410 includes: (1) a chamber connector 1420; (2) a chamber fuel mixer 1430 suitably connected to the chamber connector 1420; (3) a cylinder head connector 1440 suitably connected to the chamber connector 1420 and the chamber fuel mixer 1430; and (4) a dosing lever engager 1450 suitably connected to the cylinder head connector 1440.

In the illustrated example, the chamber ring 1400 is fabricated from a suitable metal or metal alloy such as aluminum that is configured to withstand the operational conditions of the tool 1050. As such, the chamber ring 1400 can be cast, machined, or otherwise fabricated to form a monolithic structure including the chamber connector 1420, the chamber fuel mixer 1430, the cylinder head connector 1440, the dosing lever engager 1450, and other such castable and/or machinable features and components of the chamber ring 1400. It should be understood that the chamber connector 1420, the chamber fuel mixer 1430, the cylinder head connector 1440, and the dosing lever engager 1450 can alternatively be formed as two or more separate components that are suitably connected or that are fastened to the body 1410 during fabrication of the chamber ring 1400.

In the illustrated example embodiment, the chamber connector 1420 of the body 1410 includes; (1) an outer portion 1421 defining an outer circumference of the body 1410; (2) a plurality of fastening flanges 1422, 1423, 1424, and 1425 extending radially outward from the outer portion 1421; (3) a chamber engagement surface 1426 configured as an annular surface circumferentially defined around a bottom of the chamber connector 1420; (4) a cylindrical surface 1427 connected to the chamber engagement surface 1426; and (5) an annular surface 1428 connected to the cylindrical surface 1427 and the chamber fuel mixer 1430. In the illustrated example embodiment, the cylindrical surface 1427 and the annular surface 1428 define an annular groove 1429 between the chamber connector 1420 and the chamber fuel mixer 1430.

In the illustrated example embodiment, the chamber ring 1400 is mounted on and connected to an upper portion of the combustion chamber 1220. More specifically, the chamber engagement surface 1426 is aligned with and engaged to an upper surface of the combustion chamber 1220. The plurality of fastening flanges 1422, 1423, 1424, and 1425 are each configured to receive a fastener (not shown) such as a threaded bolt that is threadably received in a portion of the combustion chamber 1220 to fixedly connect the chamber ring 1400 to the combustion chamber 1220.

In the illustrated example embodiment, the chamber fuel mixer 1430 includes: (1) an outer cylindrical surface 1431 connected to the annular surface 1428 of the chamber connector 1420; (2) a bottom annular surface 1432 connected to the outer cylindrical surface 1431; (3) an inner cylindrical surface 1433 connected to the bottom annular surface 1432; and (4) a top annular surface 1434 connected to the inner cylindrical surface 1433 and the cylinder head connector 1440. In the illustrated example embodiment, the bottom and top annular surfaces 1432 and 1434 are downwardly sloping surfaces. For example, the bottom annular surface 1432 slopes downward from the outer cylindrical surface 1431 to the inner cylindrical surface 1433, and the top annular surface 1434 slopes downward from the cylinder head connector 1440 to the inner cylindrical surface 1433 to define the downwardly sloping profile of the chamber fuel mixer 1430.

In the illustrated example embodiment, an angle $\alpha 1$ formed between the bottom annular surface 1432 and the inner cylindrical surface 1433 defines a desired slope of the bottom annular surface 1432. For example, the angle $\alpha 1$ can be configured to form a 77° angle between the bottom annular surface 1432 and the inner cylindrical surface 1433 such that the bottom annular surface slopes downward a desired amount between the outer cylindrical surface 1431 and the inner cylindrical surface of the chamber fuel mixer 1430. It will be understood that other angle values are possible to define the bottom annular surface slope. For example, al can be up to approximately a 90 degree angle in various other embodiments. It should thus be appreciated that the surface should not extend upwardly toward the central axis of the chamber ring 1400 in accordance with the present disclosure.

In the illustrated example embodiment, an angle $\alpha 2$ formed between the top annular surface 1434 and the inner cylindrical surface 1433 defines a desired slope of the top annular surface 1434. For example, the angle $\alpha 2$ can be configured to form approximately 105 degree angle between the top annular surface 1434 and the inner cylindrical surface 1433 such that the top annular surface slopes downward a desired amount between the cylinder head connector 1440 and the inner cylindrical surface 1433 of the chamber fuel mixer 1430. It will be understood that other angle values are possible to define the top annular surface slope.

In the illustrated example embodiment, the cylinder head connector 1440 includes a plurality of connector portions 1441, 1442, 1443, 1444, 1445, 1446, 1447, and 1448 suitably connected to and extending from the body 1410 of the chamber ring 1400. In the illustrated example, the connector portions 1441, 1442, 1443 1444, 1445, 1446, 1447, and 1448 extend upwards from a top surface of the body 1410 and are configured to mate with and engage with a chamber ring receiver 1212 of the cylinder head 1210. Once mated with the chamber ring receiver 1212, the chamber ring 1400 is incapable of movement (i.e., is a static component).

Figure 9:
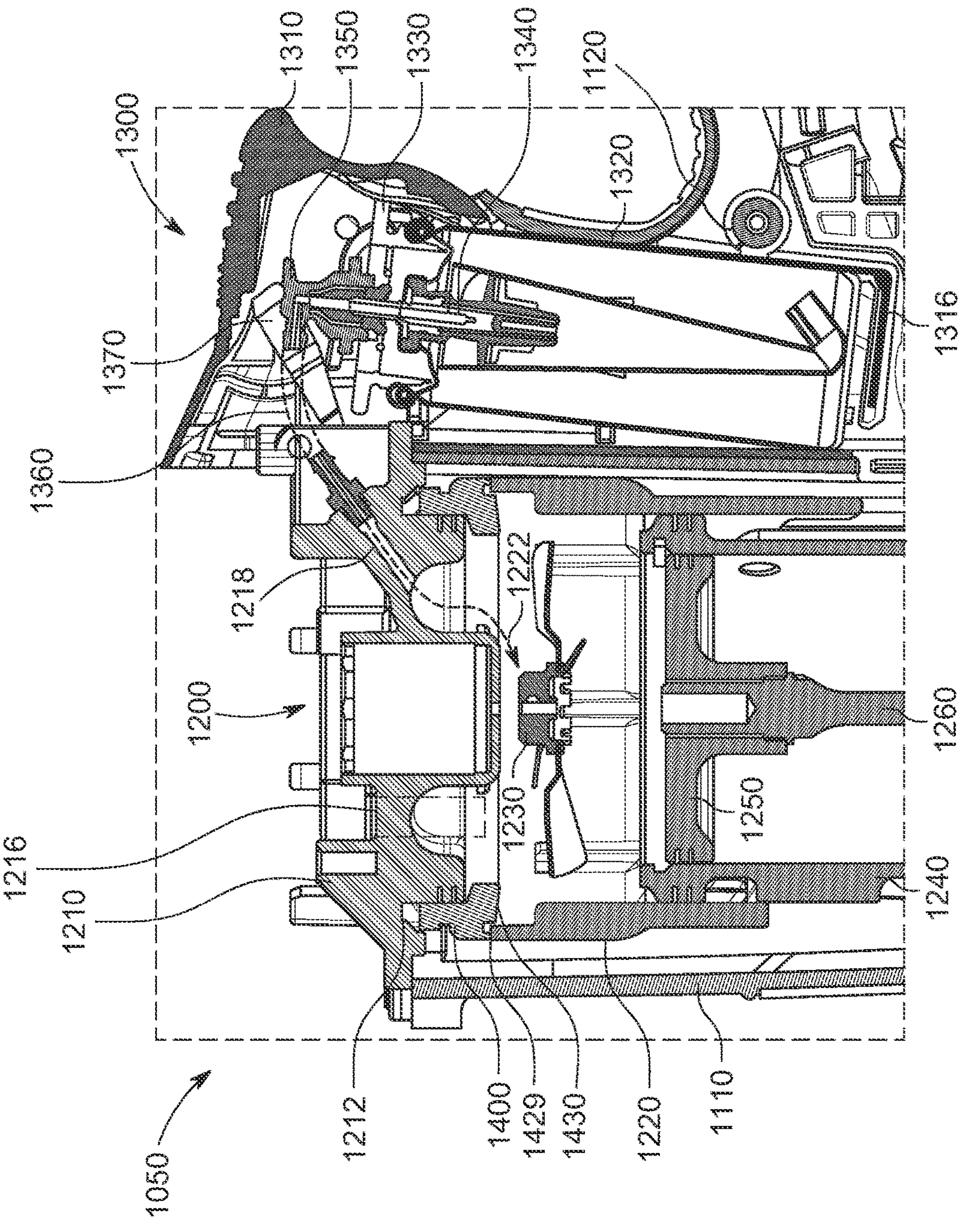
FIG. 9 is an enlarged fragmentary cross-sectional view of part of the fastener driving tool of FIG. 3, showing the fuel supply assembly, and showing part of the fastener driving assembly including the combustion chamber ring of FIG. 4.
Figure 10:
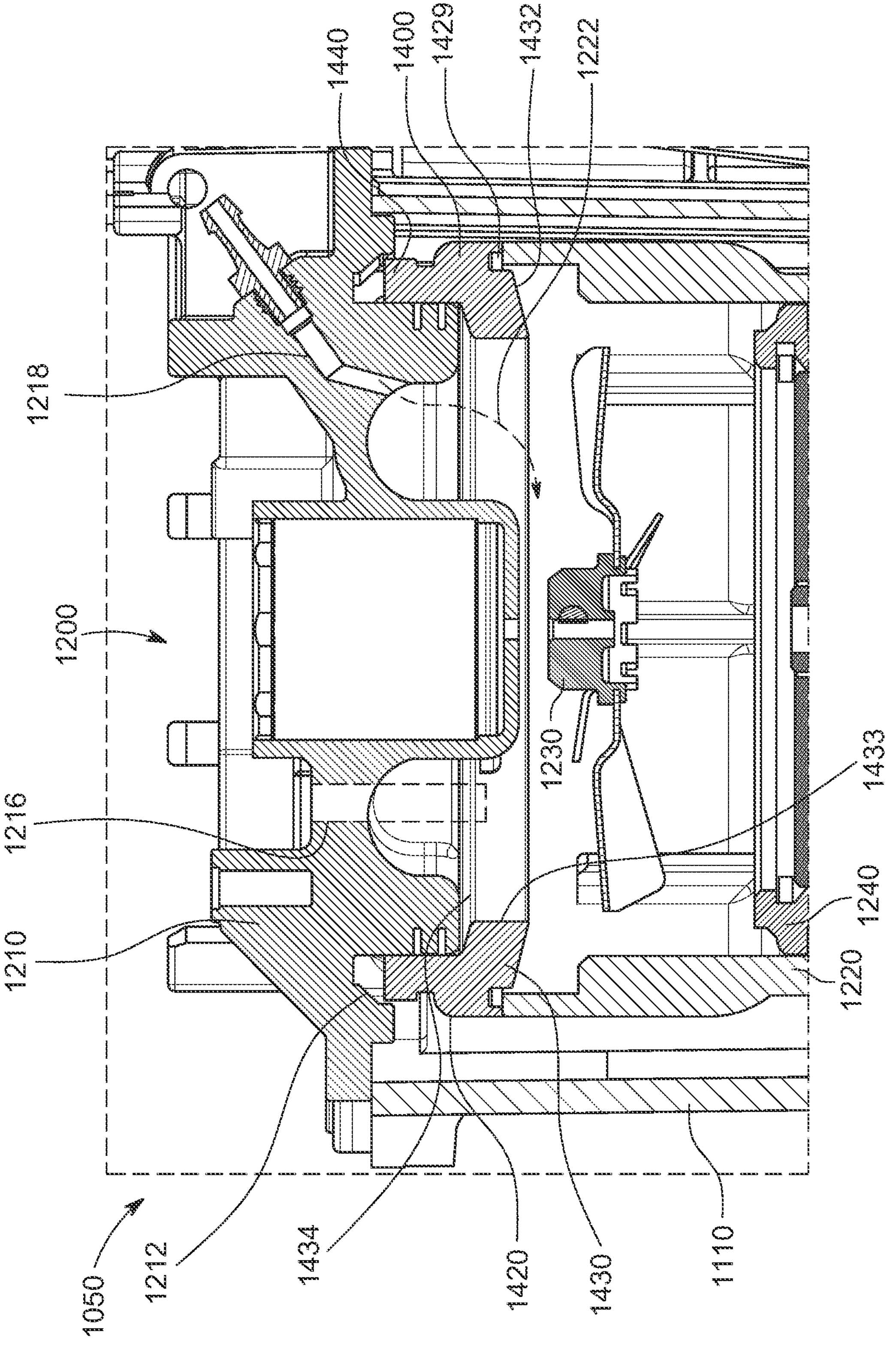
FIG. 10 is an enlarged fragmentary cross-sectional view of part of the fastener driving tool of FIG. 3, showing part of the fastener driving assembly, and showing the combustion chamber ring connected to the combustion chamber and the cylinder head.
Figure 11:
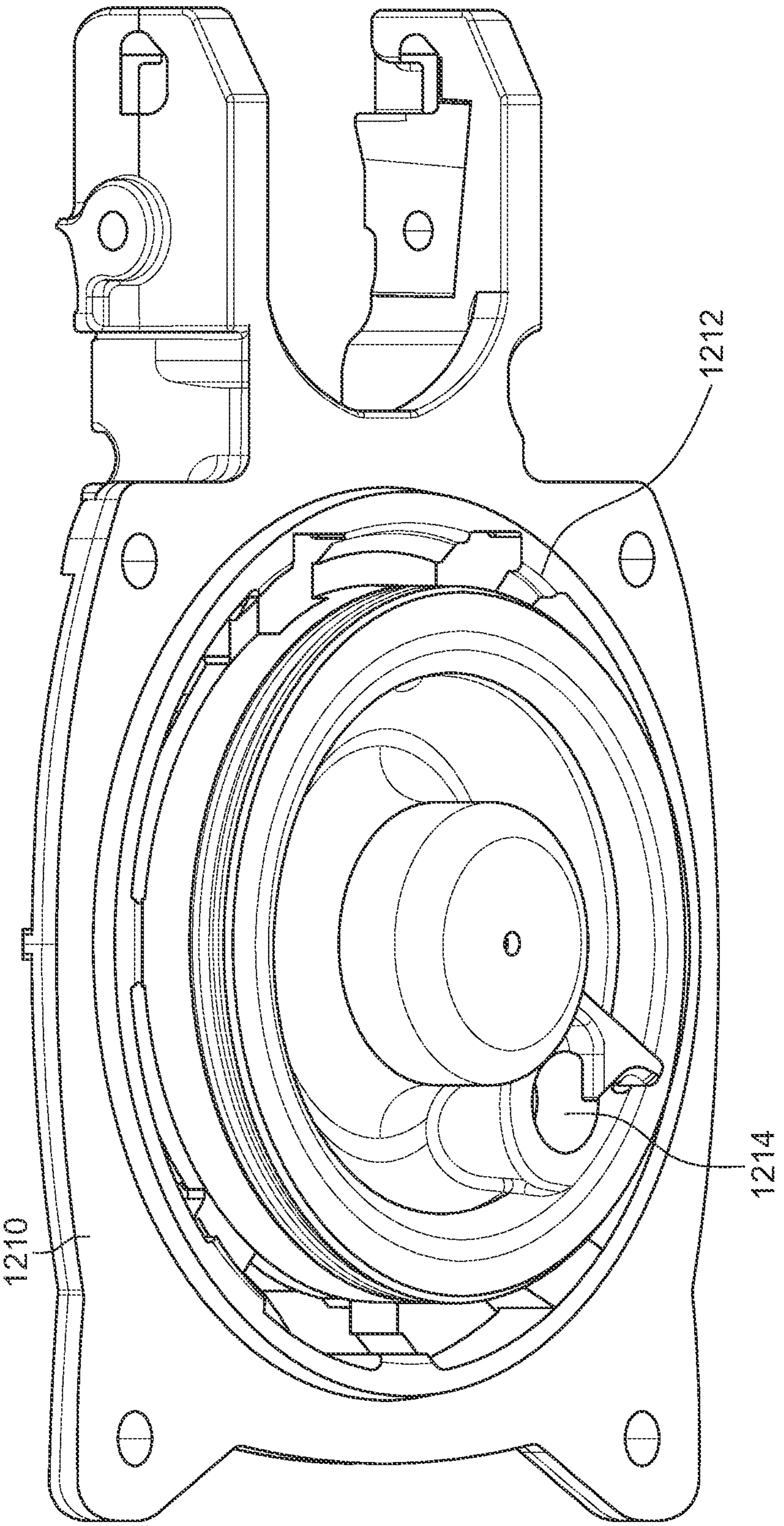
FIG. 11 is an enlarged bottom perspective view of the cylinder head of the fastener driving tool of FIG. 3, showing the spark plug receiver defined by the cylinder head.

As best shown in FIGS. 9 to 11, the chamber ring receiver 1212 of the cylinder head 1210 is configured such that the connector portions 1441, 1442, 1443, 1444, 1445, 1446, 1447, and 1448 of the cylinder head connector 1440 extend into the chamber ring receiver 1212 to suitably connect the combustion chamber ring 1400 to the cylinder head 1210. The cylinder head 1210 also includes a spark plug receiver 1214 configured to receive a spark plug 1216. The spark plug receiver 1214 is configured to removably securely receive the spark plug 1216 partly in the cylinder head 1210 such that an ignition tip of the spark plug 1216 in the combustion chamber 1220 can selectively cause combustion or ignition of a vaporized fuel dose (somewhat shown in phantom as arrow 1222) in the combustion chamber 1220.

In the illustrated example embodiment, the dosing lever engager 1450 includes a plurality of fingers 1451, 1452, 1453, 1454, 1455, 1456, 1457, and 1458 suitably connected to and extending from the body 1410 of the chamber ring 1400. In the illustrated example embodiment, finger 1451 is connected to connector portions 1448 and 1441, finger 1452 is connected to connector portions 1441 and 1442, finger 1453 is connected to connector portions 1442 and 1443, finger 1454 is connected to connector portions 1443 and 1444, finger 1455 is connected to connector portions 1444 and 1445, finger 1456 is connected to connector portions 1445 and 1446, finger 1457 is connected to connector portions 1446 and 1447, and finger 1458 is connected to connector portions 1447 and 1448.

In the illustrated example embodiment, during operation of the tool 1050 the chamber ring 1400 engages with the dosing lever 1370 to cause the fuel supply assembly 1300 to dispense the fuel 1222 into the combustion chamber 1220. More specifically, actuation of the tool 1050 causes at least one of the fingers 1451, 1452, 1453, 1454, 1455, 1456, 1457, and 1458 of the dosing lever engager 1450 to engage with and cause the dosing lever 1370 to pivot between a non-actuated position and an actuated position. In the illustrated example embodiment, actuation of the dosing lever 1370 causes a subsequent depression of the fuel cell receiving block 1350 and fuel cell metering valve 1340 such that the fuel supply assembly 1300 delivers the dose of fuel from the fuel cell 1320 to the combustion chamber 1220.

In the illustrated example embodiment, and as shown in FIGS. 9 and 10, the fuel supply assembly 1300 delivers the fuel dose 1222 into the combustion chamber 1220 via the fuel line 1360 and a fuel passageway 1218 defined in the cylinder head 1210. In the illustrated example embodiment, the fuel supply assembly 1300 dispenses the fuel dose 1222 in vaporized form and the circulating fan 1230 mixes the vaporized fuel dose 1222 with the air inside the combustion chamber 1220 to create a desired an air/fuel mixture of the tool 1050. In the illustrated example embodiment, the chamber ring 1400 is connected to the cylinder head 1210 and the combustion chamber 1220 such that the chamber fuel mixer 1430 extends into at least a portion of the combustion chamber.

In the illustrated example embodiment, and as shown in FIGS. 9 and 10, the top annular surface 1434 of the chamber fuel mixer 1430 is adjacent the cylinder head 1210 and the bottom annular surface 1432 faces the circulating fan 1230 and extends through at least a portion of the combustion chamber 1220. The top annular surface 1434 slopes downward from the cylinder head connector 1440 to the inner cylindrical surface 1433 and the bottom annular surface 1432 slopes downward from the outer cylindrical surface 1431 to the inner cylindrical surface 1433 to define the downwardly sloping profile of the chamber fuel mixer 1430. As such, when the fuel supply assembly 1300 dispenses the vaporized fuel dose 1222 into the combustion chamber 1220, the circulating fan 1230 mixes the fuel dose 1222 in the combustion chamber 1220 and the chamber fuel mixer 1430 generates a desired flow or circulation pattern of the vaporized fuel dose 1222 in the combustion chamber 1220.

In the illustrated example embodiment, the downward sloping profile of the chamber fuel mixer 1430 is configured to cause the vaporized fuel dose 1222 to be directed away from the ignition tip of the spark plug to reduce the turbulence and velocity of the vaporized fuel dose 222 at the ignition tip of the spark plug as it circulates within the combustion chamber 1220. Thus, even certain operating conditions, such as when the temperature is relatively low, the vaporized fuel dose 1222 is substantially less likely to prevent sparks at the ignition tip of the spark plug. Thus, the downward sloping profile of the chamber fuel mixer 1430 reduces the vaporized fuel directed at the tip of the spark plug within the combustion chamber such that even if the temperature is relatively low, the fuel dose 1222 at the tip of the spark plug is more likely to ignite. Accordingly, the combustion chamber ring 1400 produces the desired flow or circulation pattern around the spark plug 1216 such that there is more likely to be complete and consistent combustion of the fuel 1222.

Various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A fastener driving tool comprising:
- a housing;
- a fuel supply assembly in the housing;
- a workpiece contact assembly connected to the housing; and
- a fastener driving assembly at least partially in the housing, the fastener driving assembly including:
  - a combustion chamber,
  - a spark plug receiver configured to receive a spark plug such that an ignition tip of the spark plug is positioned in the combustion chamber,
  - a cylinder head configured to receive a vaporized fuel dose from the fuel supply assembly and transport the vaporized fuel dose to the combustion chamber,
  - a static combustion chamber ring connecting the cylinder head to the combustion chamber, the static combustion chamber ring comprises a chamber fuel mixer including a downward sloping surface that extends through a portion of the combustion chamber to direct the vaporized fuel dose in the combustion chamber in a direction away from the ignition tip of the spark plug,
  - a sleeve suitably connected to the combustion chamber, and
  - a circulating fan disposed between the sleeve and the static combustion chamber ring.

2. The fastener driving tool of claim 1, wherein the downward sloping surface is angled to reduce turbulence of the vaporized fuel dose at the ignition tip of the spark plug.

3. The fastener driving tool of claim 1, wherein the static combustion chamber ring further comprises:
- a chamber connector suitably connected to the chamber fuel mixer;
- a cylinder head connector suitably connected to the chamber connector and the chamber fuel mixer; and
- a dosing lever engager suitably connected to the cylinder head connector.

4. The fastener driving tool of claim 3, wherein the chamber fuel mixer comprises:
- an outer cylindrical surface connected to the chamber connector;
- a bottom annular surface connected to the outer cylindrical surface;
- an inner cylindrical surface connected to the bottom annular surface; and
- a top annular surface connected to the inner cylindrical surface and the cylinder head connector.

5. The fastener driving tool of claim 4, wherein the downward sloping surface of the of the chamber fuel mixer extends along the bottom annular surface from the outer cylindrical surface to the inner cylindrical surface.

6. The fastener driving tool of claim 4, wherein a slope of the bottom annular surface is defined by an angle formed between the bottom annular surface and the inner cylindrical surface.

7. The fastener driving tool of claim 3, wherein the static combustion chamber ring is fabricated to form a monolithic structure including the chamber connector, the chamber fuel mixer, the cylinder head connector, and the dosing lever engager.

8. The fastener driving tool of claim 7, wherein the monolithic structure of the static combustion chamber ring is fabricated from aluminum.

9. A fastener driving tool comprising:
- a housing;
- a fuel supply assembly in the housing;
- a workpiece contact assembly connected to the housing; and
- a fastener driving assembly at least partially in the housing, the fastener driving assembly including:
  - a combustion chamber,
  - a spark plug receiver configured to receive a spark plug such that an ignition tip of the spark plug is positioned in the combustion chamber,
  - a cylinder head configured to receive a vaporized fuel dose from the fuel supply assembly and transport the vaporized fuel dose to the combustion chamber,
  - a static combustion chamber ring connecting the cylinder head to the combustion chamber, the static combustion chamber ring comprises:
    - a chamber fuel mixer including a downward sloping surface that extends through a portion of the combustion chamber to direct the vaporized fuel dose in the combustion chamber in a direction away from the ignition tip of the spark plug, wherein the downward sloping surface is angled to reduce turbulence and a velocity of the vaporized fuel dose at the ignition tip of the spark plug,
    - a chamber connector suitably connected to the chamber fuel mixer,
    - a cylinder head connector suitably connected to the chamber connector and the chamber fuel mixer, and
    - a dosing lever engager suitably connected to the cylinder head connector;
  - a sleeve suitably connected to the combustion chamber, and
  - a circulating fan disposed between the sleeve and the static combustion chamber ring.

10. The fastener driving tool of claim 9, wherein the chamber fuel mixer comprises:
- an outer cylindrical surface connected to the chamber connector;
- a bottom annular surface connected to the outer cylindrical surface;
- an inner cylindrical surface connected to the bottom annular surface; and
- a top annular surface connected to the inner cylindrical surface and the cylinder head connector.

11. The fastener driving tool of claim 10, wherein the downward sloping surface of the of the chamber fuel mixer extends along the bottom annular surface from the outer cylindrical surface to the inner cylindrical surface.

12. The fastener driving tool of claim 11, wherein a slope of the bottom annular surface is defined by an angle formed between the bottom annular surface and the inner cylindrical surface.

13. The fastener driving tool of claim 12, wherein the static combustion chamber ring is fabricated to form a monolithic structure including the chamber connector, the chamber fuel mixer, the cylinder head connector, and the dosing lever engager.

14. The fastener driving tool of claim 13, wherein the monolithic structure of the static combustion chamber ring is fabricated from aluminum.

* * * * *